US012388219B2

(12) United States Patent
Nuti et al.

(10) Patent No.: US 12,388,219 B2
(45) Date of Patent: Aug. 12, 2025

(54) MODULAR COMPONENT POWER OUTLET FOR A POWER SUPPLY STRIP

(71) Applicant: Qualtek Electronics Corporation, Mentor, OH (US)

(72) Inventors: Robert J. Nuti, Concord Township, OH (US); John J. Hallums, III, Cleveland, OH (US)

(73) Assignee: QUALTEK ELECTRONICS CORPORATION, Mentor, OH (US)

( * ) Notice: Subject to any disclaimer, the term of this patent is extended or adjusted under 35 U.S.C. 154(b) by 387 days.

(21) Appl. No.: 17/983,504

(22) Filed: Nov. 9, 2022

(65) Prior Publication Data

US 2023/0146211 A1 May 11, 2023

Related U.S. Application Data

(60) Provisional application No. 63/277,280, filed on Nov. 9, 2021.

(51) Int. Cl.

| | |
|---|---|
| ***H01R 13/639*** | (2006.01) |
| ***H01R 13/24*** | (2006.01) |
| ***H01R 13/514*** | (2006.01) |
| ***H01R 13/518*** | (2006.01) |
| ***H01R 25/00*** | (2006.01) |

(52) U.S. Cl.

CPC ......... *H01R 13/639* (2013.01); *H01R 13/245* (2013.01); *H01R 13/514* (2013.01); *H01R 13/518* (2013.01); *H01R 25/006* (2013.01)

(58) Field of Classification Search

None

See application file for complete search history.

(56) References Cited

U.S. PATENT DOCUMENTS

| | | | | |
|---|---|---|---|---|
| 6,220,880 B1 * | 4/2001 | Lee | H01R 25/003 | 439/535 |
| 6,830,477 B2 * | 12/2004 | Vander Vorste | H01R 13/743 | 439/535 |
| 8,882,536 B2 * | 11/2014 | Utz | H05K 7/1492 | 439/535 |
| 10,573,436 B2 * | 2/2020 | Coyle | H01B 17/586 | |
| 2015/0351263 A1 * | 12/2015 | DeSanctis | H02J 4/00 | 307/42 |
| 2019/0115705 A1 * | 4/2019 | Duncan | H01R 27/00 | |

* cited by examiner

*Primary Examiner* — Oscar C Jimenez

(74) *Attorney, Agent, or Firm* — Cooper Legal Group LLC

(57) ABSTRACT

A power outlet, and associated method, for an electrical power supply strip. The power outlet includes a housing, an electrical connection for receiving first electrical power type, electrical components to change the first electrical power type to a second electrical power type, and a connection interface to supplying the second electrical power type. The power outlet housing has a body with a shape that corresponds to a shaped aperture of a main housing of the strip. A front portion of the power outlet housing is larger than the shaped aperture. An elastically deformable arm extends from the body and deforms as the arm passes through the shaped aperture of the main housing. An engagement portion of the arm retains the power outlet housing relative to the main housing.

20 Claims, 11 Drawing Sheets

MODULAR COMPONENT POWER OUTLET FOR A POWER SUPPLY STRIP

FIELD

The present disclosure relates generally to an electrical power outlet for an electrical power supply strip.

BACKGROUND

An electrical power supply strip provides electrical power. Typically, such a power supply strip is for a location, such as a desktop. Also, the power supply strip is connected (e.g., plugged-in) to a source of electrical power (e.g., approximately 110 volts AC at approximately 60 Hz, or approximately 230 volts AC at approximately 50 Hz or other AC format dependent upon local power infrastructure). Further, the power supply strip includes plural electrical power outlet, and the plural electrical power outlets may provide different electrical power formats. Such different electrical power formats may include: approximately 110 volts AC at approximately 60 Hz (or approximately 230 volts AC at approximately 50 Hz or other AC format dependent upon local power infrastructure) and 3 to 20 volts DC. Such a 3 to 20 volts DC format may be provided via a USB type outlet.

Power strips may be varied. For example, power strips have different sizes (e.g., different number of power outlets), different arrangements/configurations, etc.

Power strips have a main housing in which the power outlets are located. Different main housings may have varied constructions. For example, different main housings may be made of different materials, different main housings may have different housing material thicknesses.

As mentioned, each power strip may have plural electrical power outlets that provide different electrical power formats. If there is a power outlet that provides a power format (e.g., 3 to 20 volts DC) that is different from the supplied power format (e.g., approximately 110 volts AC at approximately 60 Hz, or approximately 230 volts AC at approximately 50 Hz or other AC format dependent upon local power infrastructure), the power strip will include a power converter/adaptor to convert/adapt from the supplied power format.

BRIEF SUMMARY

The following presents a simplified example summary in order to provide a basic understanding of some aspects of the present disclosure. This summary is not an extensive overview of the present disclosure. It is intended to neither identify key or critical elements nor delineate the scope of the present disclosure. Its sole purpose is to present some concepts of the present disclosure in a simplified form as a prelude to the more detailed description that is presented later.

In accordance with an aspect, the present disclosure provides a power outlet for an electrical power supply strip. The strip is configured to receive a first electrical power type. The strip has a main housing. The main housing has a wall. The wall has an outer face and an inner face. The wall has a thickness between the outer face and the inner face. The wall has a shaped aperture therethrough. The power outlet includes a power outlet housing. The power outlet includes an electrical connection to connect within the electrical power supply strip to receive the first electrical power type. The power outlet includes electrical components located within the power outlet housing to change the first electrical power type to a second electrical power type. The power outlet includes a connection interface located at a front of the power outlet housing and supplying the second electrical power type. The power outlet housing has a body with a shape that corresponds to the shape of the shaped aperture of the main housing. The power outlet housing has a front portion at the front of the power outlet housing that is larger than the shaped aperture of the main housing to engage the outer face of the wall of the main housing and prevent the front portion from passing through the shaped aperture of the main housing. The power outlet housing has an elastically deformable arm extending from the body. The deformable arm deforms as the arm passes through the shaped aperture of the main housing. The deformable arm has an engagement portion that engages the inner face of the wall of the main housing after the arm passes through the shaped aperture of the main housing to entrap the wall of the main housing between the arm and the front portion and retain the power outlet housing relative to the wall of the main housing, and the deformable arm being configured to accommodate a variation of the thickness of the wall of the main housing.

In accordance with an aspect, the present disclosure provides an electrical power supply strip configured to receive a first electrical power type. The power supply strip includes a main housing. The main housing has a wall. The wall has an outer face and an inner face. The wall has a thickness between the outer face and the inner face. The wall has a plurality of shaped apertures therethrough. The power supply strip includes a first power outlet that provides a supply of the first electrical power type. The first power outlet is located within one of the shaped apertures. The power supply strip includes a second power outlet.

The second power outlet includes a power outlet housing. The second power outlet includes an electrical connection to connect within the electrical power supply strip to receive the first electrical power type. The second power outlet includes electrical components located within the power outlet housing to change the first electrical power type to a second electrical power type. The second power outlet includes a connection interface located at a front of the power outlet housing and supplying the second electrical power type. The power outlet housing has a body with a shape that corresponds to the shape of the shaped aperture of the main housing. The power outlet housing has a front portion at the front of the power outlet housing that is larger than the shaped aperture of the main housing to engage the outer face of the wall of the main housing and prevent the front portion from passing through the shaped aperture of the main housing. The power outlet housing has an elastically deformable arm extending from the body. The deformable arm deforms as the arm passes through the shaped aperture of the main housing. The deformable arm has an engagement portion that engages the inner face of the wall of the main housing after the arm passes through the shaped aperture of the main housing to entrap the wall of the main housing between the arm and the front portion and retain the power outlet housing relative to the wall of the main housing, and the deformable arm being configured to accommodate a variation of the thickness of the wall of the main housing.

In accordance with an aspect, the present disclosure provides an associated method for providing the power outlet and the electrical power supply strip.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Figure 2:
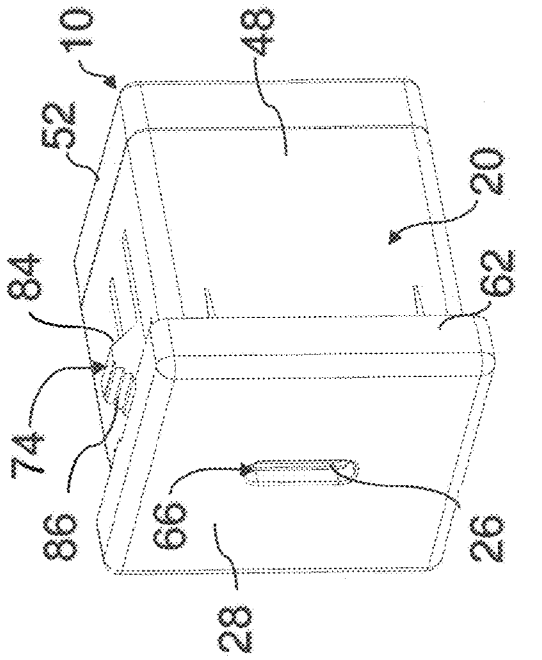
FIG. 2 is another perspective view of the example power outlet of FIG. 1.
Figure 1:
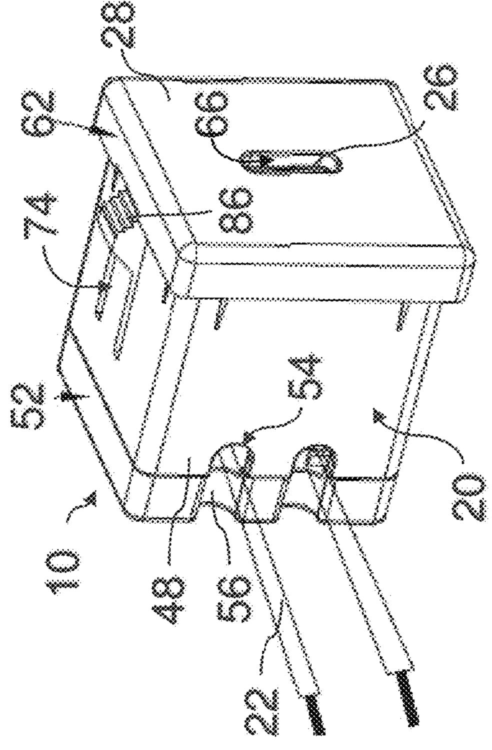
FIG. 1 is a perspective view of an example power outlet in accordance with at least one aspect of the present disclosure.
Figure 4:
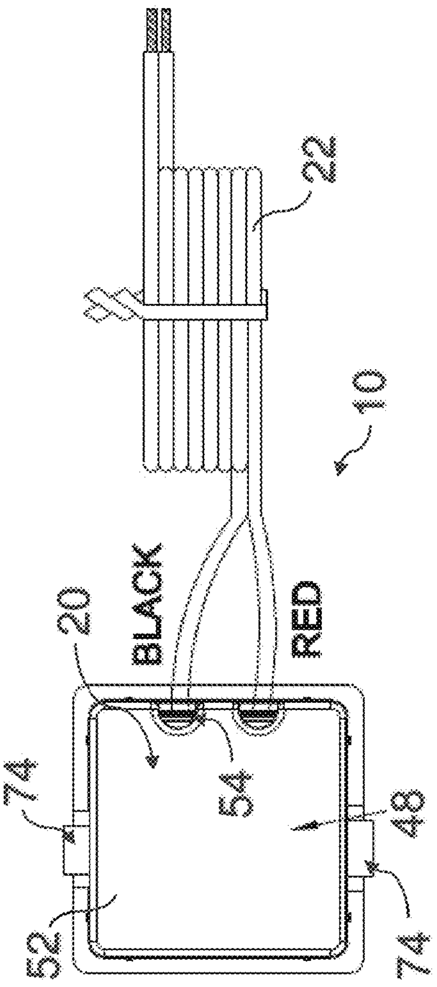
FIG. 4 is a back or rear view of the example power outlet of FIG. 1.
Figure 3:
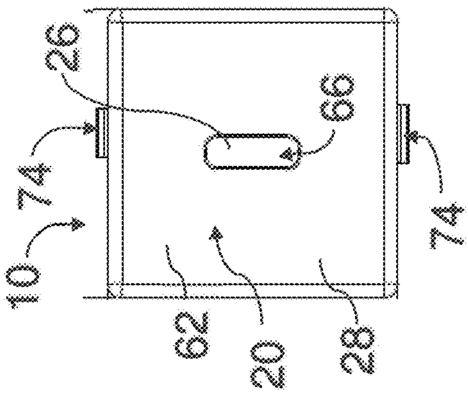
FIG. 3 is a front view of the example power outlet of FIG. 1.
Figure 6:
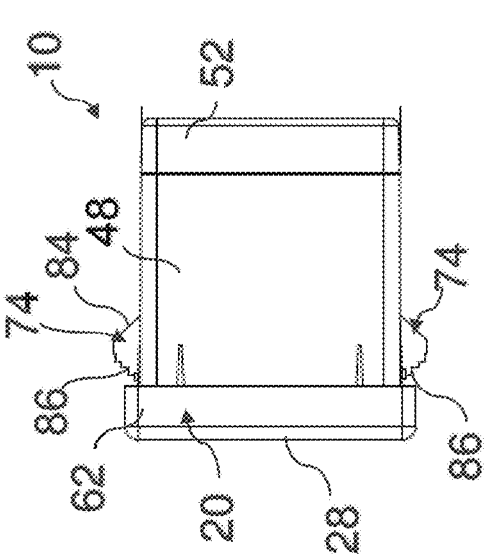
FIG. 6 is a second side view of the example power outlet of FIG. 1.
Figure 8:
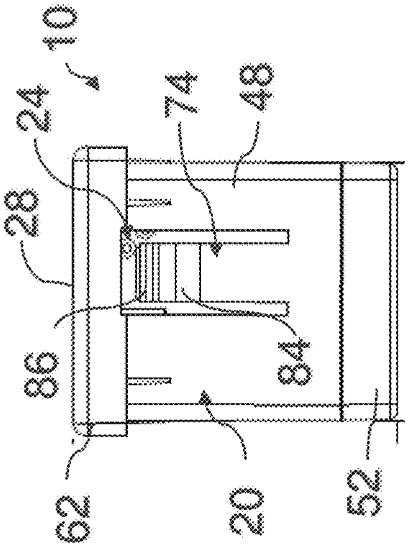
FIG. 8 is a fourth side view of the example power outlet of FIG. 1.
Figure 5:
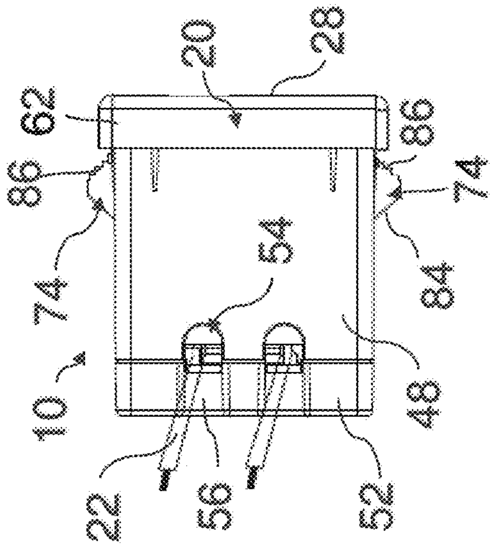
FIG. 5 is a first side view of the example power outlet of FIG. 1.
Figure 7:
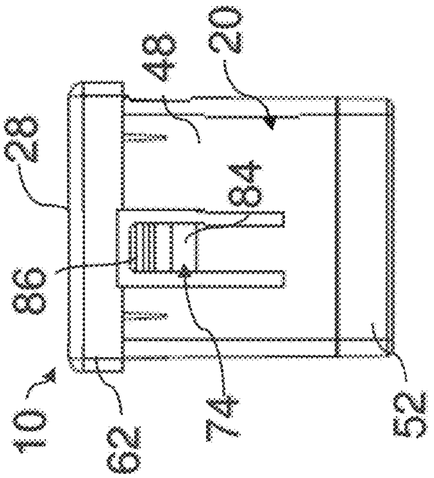
FIG. 7 is a third side view of the example power outlet of FIG. 1.
Figure 9:
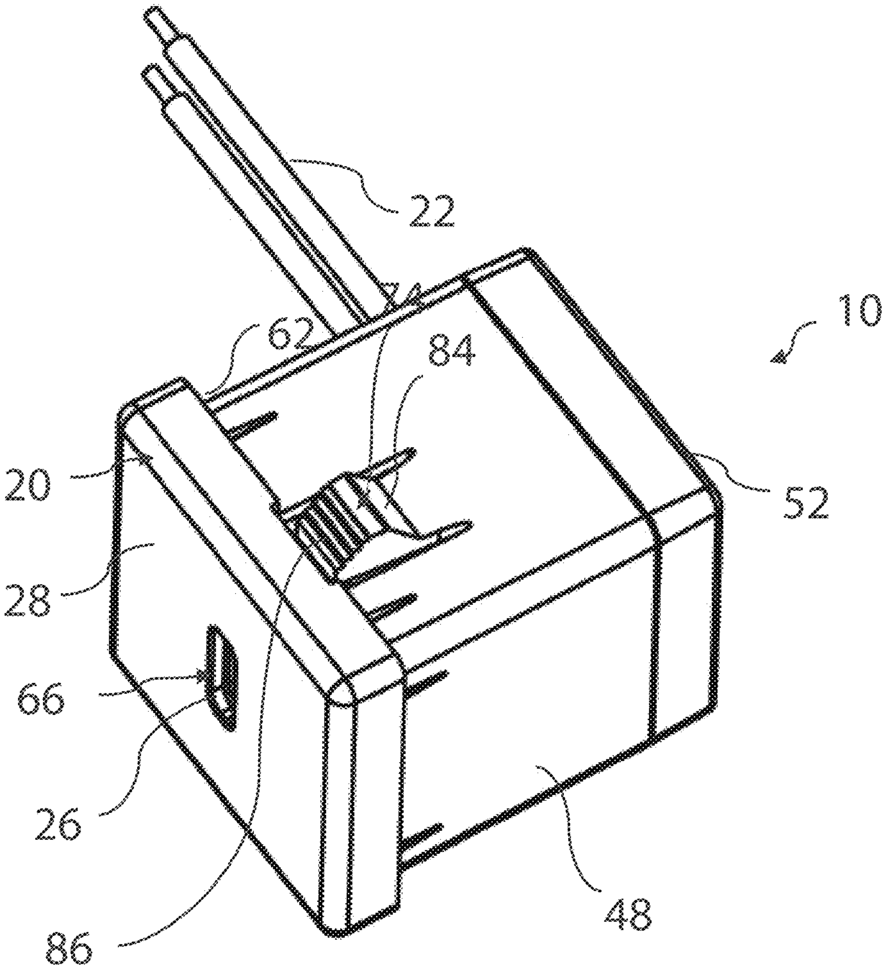
FIG. 9 is a perspective photograph of the example power outlet of FIG. 1.
Figure 10:
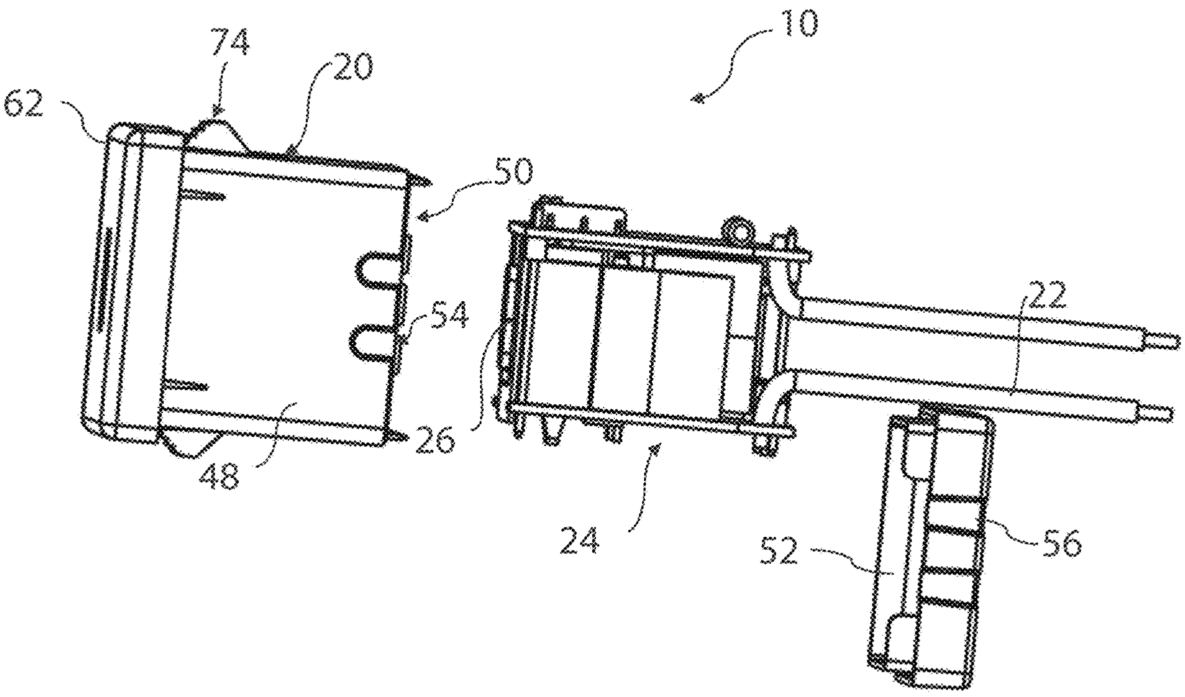
FIG. 10 is a perspective photograph of an explosion of the example power outlet of FIG. 1, and shows electrical components of the power outlet that are within a housing of the power outlet.
Figure 11:
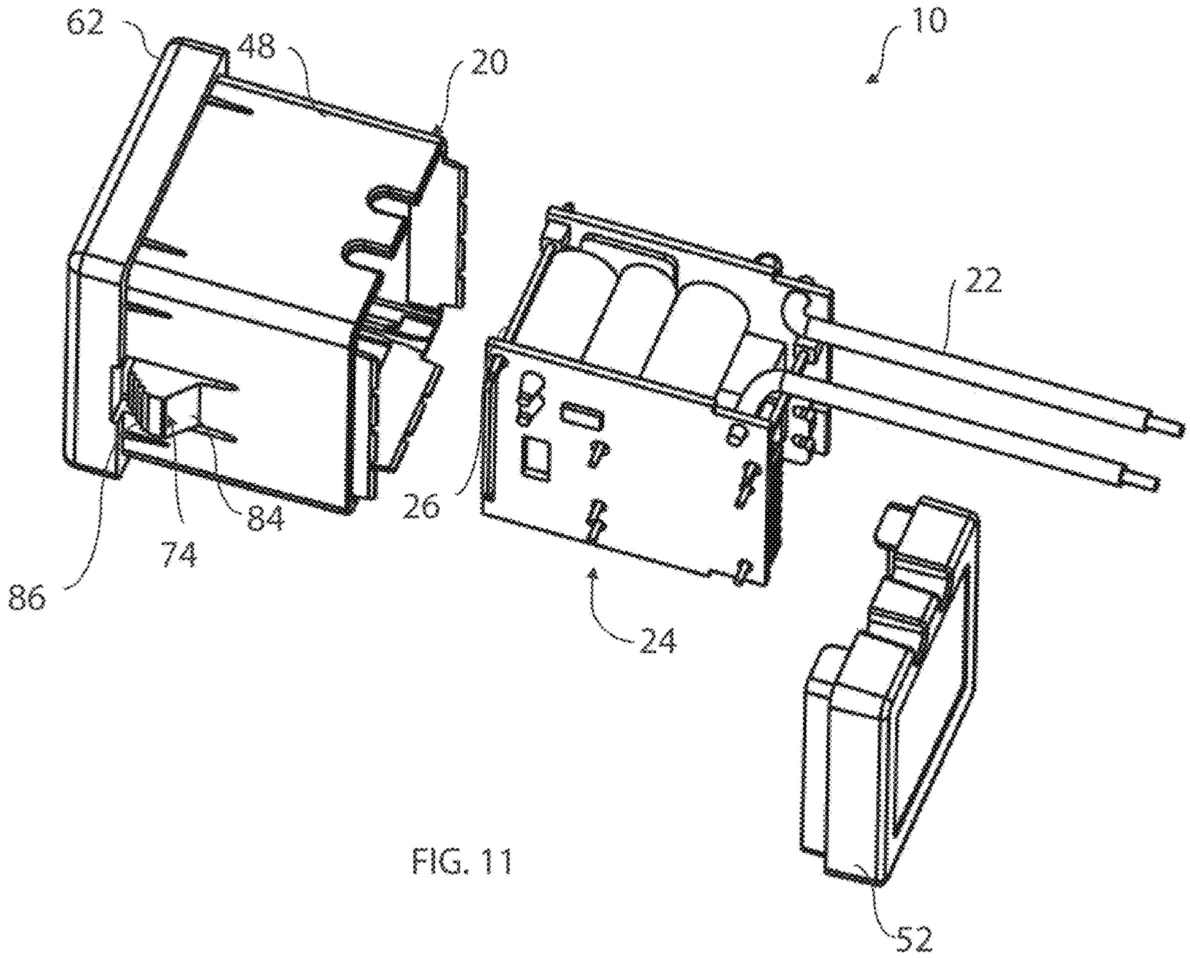
FIG. 11 is another perspective photograph of the explosion of the example power outlet of FIG. 1.
Figure 12:
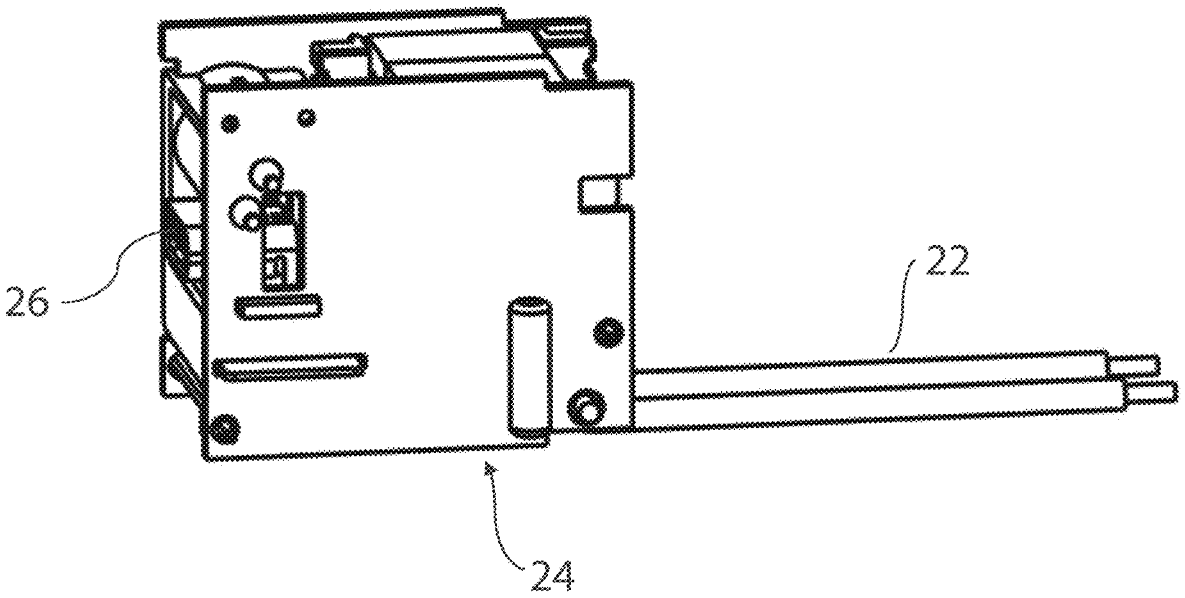
FIG. 12 is a perspective photograph of the electrical components, which are inverted as compared to FIGS. 10 and 11.
Figure 13:
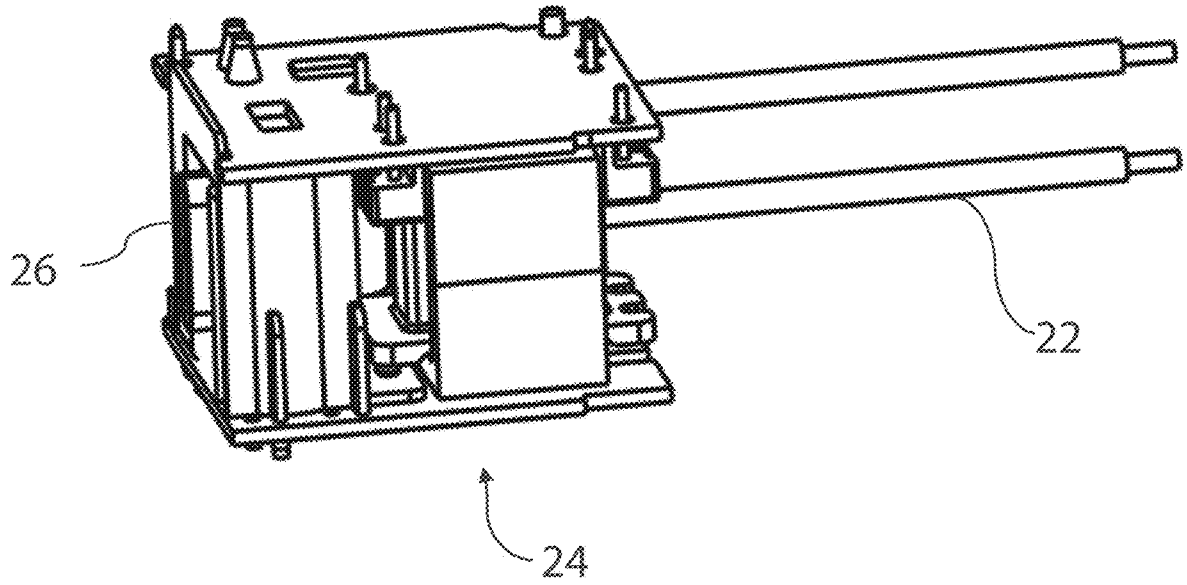
FIG. 13 is a perspective photograph of electrical components, which are laid on side as compared to FIGS. 10 and 11.
Figure 14:
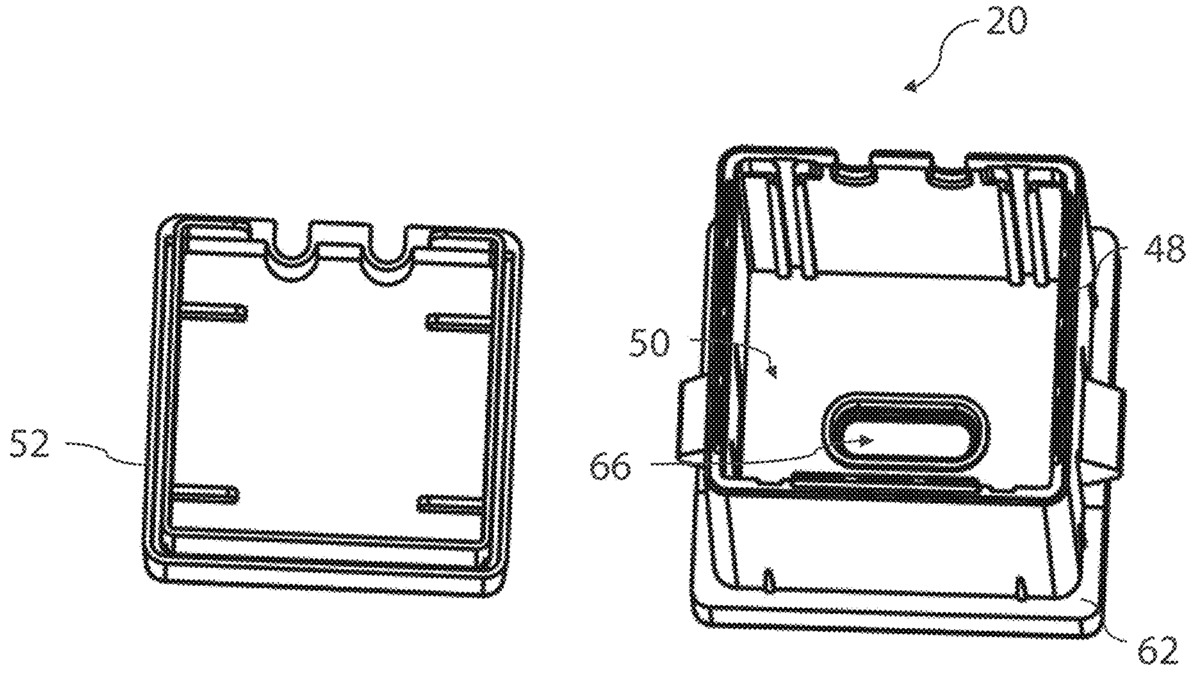
FIG. 14 is a perspective photograph of an explosion/disassembly of the housing of the power outlet of FIGS. 10 and 11.
Figure 15:
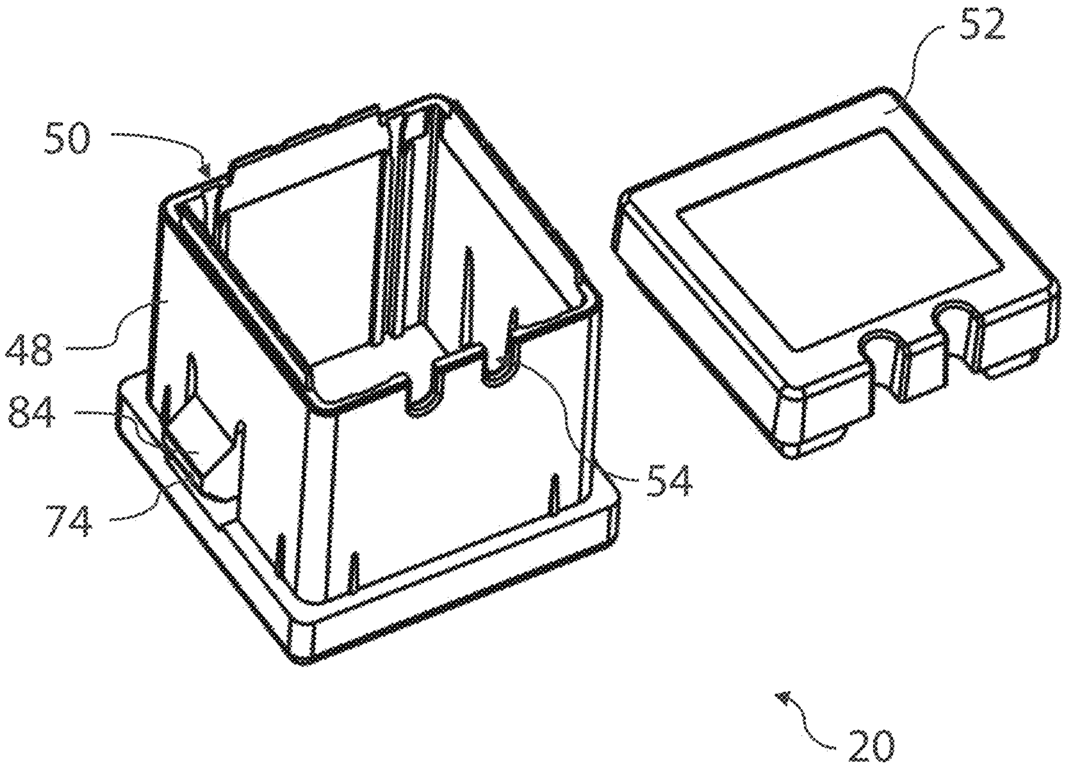
FIG. 15 is another perspective photograph of the explosion/disassembly of the housing of the power outlet of FIGS. 10 and 11.

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

Certain terminology is used herein for convenience only and is not to be taken as a limitation on the disclosed subject matter. Relative language used herein is best understood with reference to the drawings, in which like numerals are used to identify like or similar items. Further, in the drawings, certain features may be shown in somewhat schematic form.

The following subject matter may be embodied in a variety of different forms, such as methods, devices, components, and/or systems. Accordingly, this subject matter is not intended to be construed as limited to any illustrative embodiments set forth herein as examples. Rather, the embodiments are provided herein merely to be illustrative.

Figure 16:
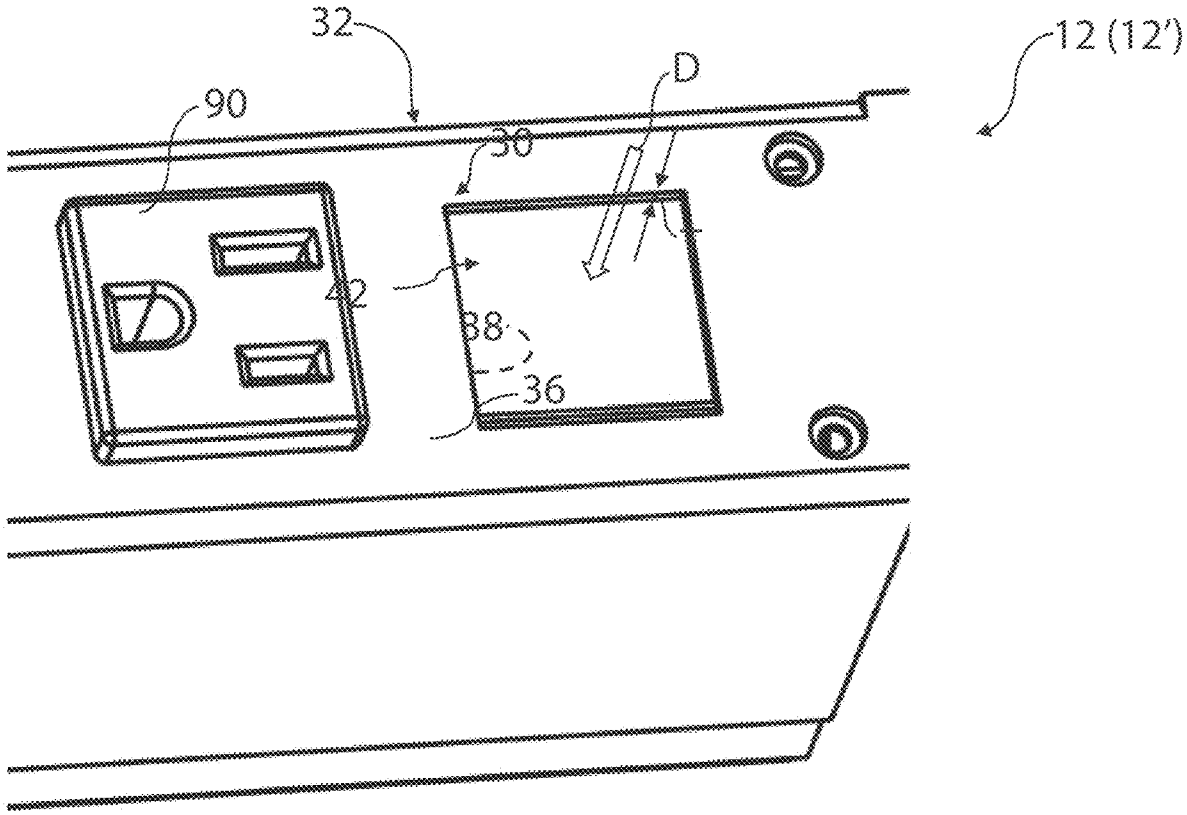
FIG. 16 is a perspective photograph of an example portion of an example main housing, having a wall thickness, of an example power strip within which a power outlet in accordance with at least one aspect of the present disclosure may be utilized.
Figure 17:
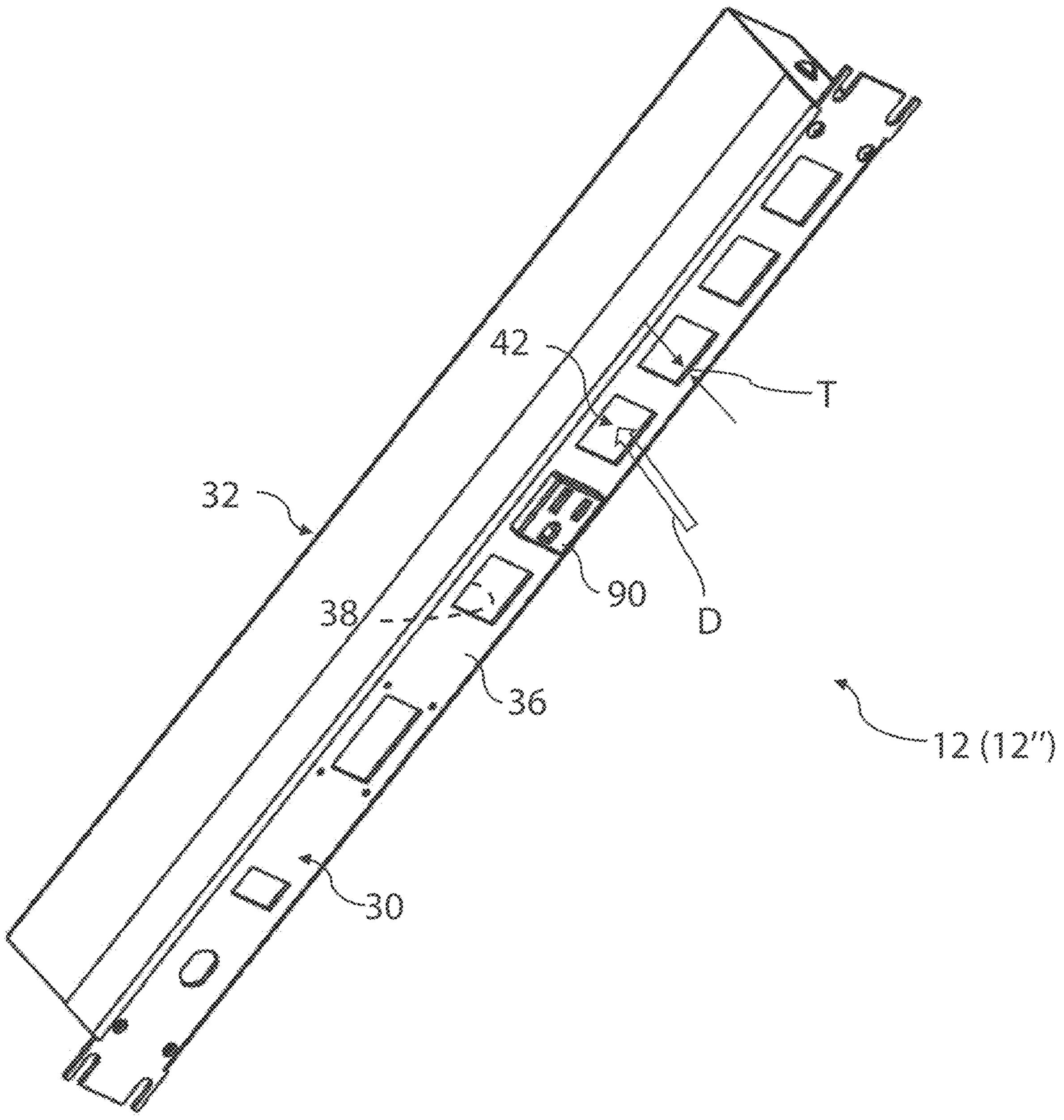
FIG. 17 is a perspective photograph of an example portion of an example main housing, having a wall thickness, of another example power strip within which one or more power outlets in accordance with at least one aspect of the present disclosure may be utilized.

An example power outlet 10 for an electrical power supply strip is shown within FIGS. 1-11, with some selected portions of the power outlet 10 being shown in FIGS. 12-15. Examples of portions of an electrical power supply strips 12 (i.e., 12' and 12"), within which the power outlet 10 may be used, are shown in FIGS. 16 and 17.

In general, the power outlet 10 (FIGS. 1-11) includes: a power outlet housing 20, an electrical connection (e.g., two wire leads) 22 to connect within the electrical power supply strip 12 to receive a first electrical power type, electrical components 24 (see FIGS. 10-13) located within the power outlet housing 20 (see FIGS. 8, 10 and 11) to change the first electrical power type to a second electrical power type, and a connection interface 26 (see FIGS. 1-3 and 10-12) located at a front 28 of the power outlet housing 20 and supplying the second electrical power type. Within an example, the connection interface 26 may be a USB type connection interface. Within an example, the second electrical power type may be approximately 3 to 20 volts direct current (DC) format.

Of course, the second electrical power type may be varied. One example variant includes other DC voltages. Within such variation, one more specific example may be approximately 40 volts DC. So, an example range may be approximately 3 to 40 volts DC. Moreover, the second electrical power type may be further varied, including being an alternating current at any voltage and any frequency.

Of course, the connection interface, and the second electrical power type supplied thereby, may be varied and such variation is within the scope of the present disclosure. Moreover, further variations are contemplated and within the scope of the present disclosure. For example, the USB type outlet may be: USB A, USB B, USB C USB mini, USB micro, etc. Still further, the provision of power may be a variety of pin configurations, pin numbers, etc. As such, a wide variation of different electrical power formats, and associated provision configuration of such, are contemplated and thus within the scope of the present disclosure. According, the different electrical power formats, and associated provision configuration, is to be broadly interpreted.

It is to be appreciated that some of the aspects of the present disclosure include the following: The power outlet 10 is provided as a modular component that may be swiftly and economically installed within the power supply strip (e.g., 12, such as examples 12' and 12", see FIGS. 16 and 17). The installation may be a one-direction D motion of the entire power outlet 10 into a wall 30 of the power supply strip (e.g., 12, such as examples 12' and 12"). The installation may automatically accommodate for variable thickness T of the wall 30 of the power supply strip 12. The power outlet 10 may be swiftly and economically connected to electrical supply within the power supply strip 12. The power outlet 10 contains its own electrical components 24, located within a power outlet housing 20, to change the first electrical power type to a second electrical power type. Thus, a need for separate electrical components, located elsewhere within the power supply strip 12, to change the first electrical power type to a second electrical power type is omitted.

Turning briefly to the electrical power supply strip 12 (see the examples of FIGS. 16 and 17), the strip is configured to receive a first electrical power type. Examples of such first electrical power type are common wall outlet type power within a dwelling, office or similar. An example of such wall outlet type power is approximately 110 volts (e.g., plus or minus 10 volts variation), alternating current (AC) at approximately 60 Hz. Another example of such wall outlet type power is approximately 230 volts (e.g., plus or minus 10 volts variation), alternating current at approximately 50 Hz. Of course, example voltages may vary higher or lower (e.g., plus or minus 10 volts or more). Thus, one example general range is approximately 100 to 240 volts AC at approximately 50 to 60 Hz. It is to be appreciated that different power types (e.g., different voltages and/or different frequencies) are within the scope of the present disclosure. Moreover, the first electrical power type may be further varied, including being a direct current at any voltage.

As mentioned, the power outlet 10 includes the electrical components 24 that are located within the power outlet housing 20 to change the first electrical power type to a second electrical power type. So, the electrical power supply strip 12 does not need to include any other electrical components that change the first electrical power type to a second electrical power type. Recall that the electrical connection (e.g., two wire leads) 22 is to be connected within the electrical power supply strip 12 to receive a first electrical power type. To be clear, the electrical connection (e.g., two wire leads) 22, and thus the electrical components 24 of the power outlet 10, receive the first electrical power type, as is (i.e., directly, without alternation).

The power outlet 10, with the included electrical components 24, provides for its own needs regarding changing from the first electrical power type to the second electrical power type. Such is beneficial in that the electrical power supply strip 12 does not need to be constructed/configured with such electrical components. Moreover, it is to be appreciated that the first electrical power type may be varied and the second electrical power type may be varied. The electrical power supply strip 12 does not need to be constructed/configured to have varied electrical components to accommodate variations in the first electrical power type and/or the second electrical power type. It is to be appreciated that an aspect of the present disclosure is that multiple, different power outlets 10 may be manufactured, available, etc. so that selection may be made among the multiple, different power outlets 10 according to the first electrical power type and/or the second electrical power type.

Within an example, the electrical components 24 of the power outlet 10 are constructed/configured to change (e.g., convert or transform) approximately 110 volts (e.g., plus or minus 10 volts) AC at approximately 60 Hz, as the first electrical power type, to approximately 3 to 40 volts DC, as the second electrical power type. Of course and as mentioned, another first electrical power type and/or another second electrical power type (e.g., approximately 230 volts AC at approximately 50 Hz) may be involved and the electrical components 24 of the power outlet 10 constructed/configured accordingly. Moreover, for such first electrical power type and/or another second electrical power type, the electrical components 24 is construction/configuration to accomplish the change (e.g., convert or transform) accordingly.

It is to be appreciated that FIGS. 16 and 17 only show a portion of the electrical power supply strip 12. Other portions of the electrical power supply strip 12 are not shown and may have a variety of constructions/configurations. Such variations, although contemplated within the scope of the present disclosure, are not limitations upon the present disclosure. The present disclosure simply includes the knowledge/understanding of the existence of other portions of the electrical power supply strip 12.

The electrical power supply strip 12 does have a main housing 32 (partially shown in FIGS. 16 and 17, i.e., only a portion is shown). The wall 30 is part of the main housing 32. Focusing upon the wall 30, the wall may have varied constructions/configurations, be made of varied materials, etc., and such variations are contemplated within the scope of the present disclosure. The wall 30 has an outer face 36 and an inner face 38 (hidden from view in FIGS. 16 and 17, and so designated via use of dash lead lines within the figures). The thickness T of the wall 30 is a measurement between the outer face 36 and the inner face 38.

The wall 30 has a shaped aperture 42 therethrough. It is contemplated that more than one shaped aperture 42 may be provided through the wall 30. For example, FIG. 17 shows at least two shaped apertures 42. It is to be appreciated that the shape (e.g., as defined within a plane of the wall 30) and size (e.g., as defined within the plane of the wall 30) of the aperture 42 may be varied and that such variation is within the scope of the present disclosure. Within the shown examples of FIGS. 16 and 17, the shape of the aperture 42 is generally rectangular, and specifically generally square. It should be noted that the shape need not be perfectly rectangular/square and that such difference from being perfectly rectangular/square is within the scope of the present disclosure.

Focusing upon the power outlet 10, the power outlet housing 20 has a body 48 that has a cross-sectional shape that corresponds to the shape of the shaped aperture 42 through the wall 30 of the main housing 32. Within the shown example of the figures, the cross-sectional shape of the body 48 is generally square. It should be noted that the shape need not be perfectly square and that such difference from being perfectly square is within the scope of the present disclosure. A cross-sectional size (i.e., area) of the body 48 is similar, but slightly smaller than the size of the shaped apertures 42. So, the body 48 may pass into the shaped apertures 42.

The body 48 of the power outlet housing 20 is hollow 50 and the electrical components 24 that are located within the power outlet housing 20 are located within the hollow 50 of the body 48. The body 48 includes a rear portion 52 that closes the hollow 50. Once the electrical components 24 are within the hollow 50 of the power outlet housing 20, the rear portion 52 is connected/secured to the remainder of the body 48. Such connection/securement may be varied. For example, the rear portion 52 may be connected to the remainder of the body 48 by a hinge, that permits pivoting between an open condition and a closed position. It is to be appreciated that FIGS. 10, 11, 14 and 15 show a hinge that has been cut in order to provide exploded views. Further, the rear portion 52 may include a latch, tab or similar that secures the rear portion 52 in a closed position. Other examples to secures the rear portion 52 in a closed position may include various fastening structures, adhesives and the like. It is to be appreciated that the specifics regarding securing the rear portion 52 in a closed position need not be limitations upon the present disclosure and variations are within the scope of the present disclosure.

The body 48 includes at least one port or opening 54 through which the electrical connection (e.g., two wire leads) 22 extend. Within the shown example, the rear portion 52 of the body 48 includes taper(s) or recess(es) 56 to accommodate the electrical connection (e.g., two wire leads) 22.

The power outlet housing 20 includes a front portion 62 at the front 28 of the power outlet housing. An opening 66 extends through the front portion. The opening 66 is aligned with the connection interface 26 such that the connection interface 26 is accessible through the front portion 62.

The front portion 62 has a cross-sectional size (i.e., area) that is larger than the cross-sectional size (i.e., area) of the body 48. The front portion 62 is also larger than the shaped aperture 42 of the main housing 32 (see FIGS. 16 and 17). Specifically, the front portion 62 has cross-sectional size (i.e., area) that is larger than the cross-sectional size (i.e., area) of the shaped aperture 42 of the main housing 32. Such larger size results in the front portion 62 being engageable to the outer face 36 of the wall 30 of the main housing 32. Such engagement prevents the front portion 62 from passing through the shaped aperture 42 of the main housing 32 (i.e., cessation of further movement in the direction D).

To be clear, when the power outlet housing 20 is inserted, in the direction D, into the shaped aperture 42 of the main housing 32, the body 48 of the power outlet housing 20 passes into and through the shaped aperture 42, but the front portion 62 abuts and stops against the outer face 36 of the wall 30 of the main housing 32. Thus, the front portion 62 helps to hold the power outlet housing 20 in the position with the front portion 62 against the outer face 36 of the wall 30 of the main housing 32 (i.e., no further movement of the power outlet 10 in the direction D).

The power outlet housing 20 includes an elastically deformable arm 74 extending from the body 48. Within the shown example, the power outlet housing 20 includes two elastically deformable arms 74. Within the shown example, the deformable arms 74 are located on opposite sides of the power outlet housing 20. Each deformable arm 74 is attached at one end of the deformable arm 74 to a side of the body 48 and the other end of the deformable arm 74 is free to move relative to the remainder of the body 48 via elastic deformation. The deformable arm 74 is constructed/configured such that the deformation may be inward relative to the remainder of the body 48.

Each deformable arm 74 includes a head portion 76. The head portion 76 has an outward extent, in a width-wise direction. When the deformable arm 74 is in a non-deformed condition, the outward extent of the head portion 76 is greater than the remainder of the body 48. As the deformable arm 74 is increasingly deformed inward, the outward extent of the head portion 76 is lessened. Upon sufficient inward deformation, the outward extent of the head portion 76 may be lessened sufficiently such that the outward extent of the head portion 76 beyond the remainder of the body 48 is zero or substantially zero. At such an inwardly deflected condition, the head portion 76 thus has no more outward extent than the remainder of the body 48. In other words, the head portion 76 of the deformable arm 74 essentially has the same outward extend or dimension as the remainder of the body 48. It is to be noted that because the deformation is elastic, the deformable arm 74 has a bias that urges the deformable arm 74 outward toward the non-deformed condition.

Recall that the power outlet 10 is provided as a modular component that may be installed within the power supply strip (e.g., 12, such as examples 12' and 12", see FIGS. 16 and 17) via the one-direction D motion of the entire power outlet housing 20 into the shaped aperture 42 of the wall 30 of the main housing 32. Also recall that upon sufficient inward deformation, the outward extent of the head portion 76 of the deformable arm 74 is essentially has the same outward extend or dimension as the remainder of the body 48. Such a condition (i.e., inward deformation of the deformable arm 74) allows the power outlet 10 to be installed within the power supply strip (e.g., 12, such as examples 12' and 12", see FIGS. 16 and 17) via the one-direction D motion of the entire power outlet housing 20 into the wall 30 of the power supply strip (e.g., 12, such as examples 12' and 12"). The deformable arm 74 simply deforms inwardly as needed. In other words, the deformable arm 74 deforms as the arm passes through the shaped aperture 42 in the wall 30 of the main housing 32.

Recall that the wall 30 has a thickness T. Dependent upon the placement of the deformable arm 74, and the head portion 76 thereon, upon the body 48, the thickness T of the wall 30, and possibly other factors, some or all of the head portion 76 may move past the wall 30 upon complete installation of the power outlet 10 (i.e., the front portion 62 abuts and stops against the outer face 36 of the wall 30 of the main housing 32). As such, the bias force of the deformable arm 74 may cause at least some outward movement of the deformable arm 74, and the head portion 76 thereon, adjacent to the inner face 38 of the wall 30. It is to be appreciated that such outward movement may be associated with the head portion 76 of the deformable arm 74 engaging/bearing upon the wall 30 at the inner face 38. Such engagement/bearing holds the power outlet 10 relative to the wall 30 of the power supply strip (e.g., 12, such as examples 12' and 12") from the inner face 38 side of the wall 30. Moreover, such holding provides for resisting a removal movement (i.e., opposite direction to the direction D) of the power outlet 10 relative to the power supply strip (e.g., 12, such as examples 12' and 12").

It is to be recalled that the front portion 62 abuts and stops against the outer face 36 of the wall 30 of the main housing 32. Thus, the front portion 62 helps to hold the power outlet housing 20 in the position with the front portion 62 against the outer face 36 of the wall 30 of the main housing 32 (i.e., no further movement of the power outlet 10 in the direction D). So, also with the head portion 76 of the deformable arm 74 engaging/bearing upon the wall 30 at the inner face 38 and holding to provide for resistance against a removal movement (i.e., opposite direction to the direction D), the power outlet 10 is held in place relative to the power supply strip (e.g., 12, such as examples 12' and 12"). So, the deformable arm 74 has an engagement portion (e.g., the head portion 76) that engages the inner face 38 of the wall 30 of the main housing 32 after the arm passes through the shaped aperture 42 of the main housing 32 to entrap the wall 30 of the main housing 32 between the arm 74 and the front portion 62 and retain the power outlet housing 20 relative to the wall 30 of the main housing 32.

The installation of the power outlet 10 into the shaped aperture 42 may automatically accommodate for variable thickness T of the wall 30 of the power supply strip 12. By that, it is to be appreciated that the amount that the deformable arm 74 is permitted to move back toward the non-deformed condition may be related to the thickness T of the wall 30. A smaller wall thickness may allow a larger amount of movement of the deformable arm 74 back toward the non-deformed condition. A larger wall thickness may allow a smaller amount of movement of the deformable arm 74 back toward the non-deformed condition. However, the resilience of the deformable arm 74 may retain a pressure (i.e., a pressing force) against the wall 30 despite such variation of wall thickness.

It is to be appreciated that the deformable arm 74, and the head portion 76 thereon, may have a varied construction/configuration. Such variation is contemplated and within the scope of the present disclosure. An example of a variant of the head portion 76 is shown within the figures. Specifically, the shown example includes a ramped or tapered surface 84 on a segment of the head portion that would first engage against the wall 30 as the power outlet 10 is inserted (i.e., moved in the direction D) into the shaped aperture 42. As such, the tapered surface 84 may be considered to be on a leading location as the power outlet 10 is inserted (i.e., moved in the direction D) into the shaped aperture 42. The tapered surface 84 helps to smoothly allow the deformable arm 74 to deform (e.g., deflect) inward, via pushing against the wall 30, as the tapered surface 84 is engaged against the against the wall 30 as the power outlet 10 is moved in the direction D. Within an example, the tapered surface 84 cams against the wall 30 of the main housing 32 to cause the deformable arm 74 to deform as the arm passes through the shaped aperture 42 of the main housing.

Further regarding the shown example of the variant of the head portion 76, the shown example includes a stair-step segment 86. Such stair-step segment is located somewhat opposite of the location of the tapered surface 84 upon the head portion 76. As such, the stair-step segment 86 may be considered to be on a trailing or following location as the power outlet 10 is inserted (i.e., moved in the direction D) into the shaped aperture 42. Each step in the stair-step segment 86 is capable of directly engaging against the wall 30 at the inner face 38. The stair stepping may provide an additional resistance to removal (i.e., in the direction opposite to the direction D) of the power outlet 10. As the power outlet 10 in inserted (i.e., moved in the direction D) into the shaped aperture 42, the stair-step segment 86 may act as click-locks. Dependent in part on the thickness T of the wall 30, a varied number of steps of the stair-step segment 86 will sequentially "click-lock" against the inner face 38 of the wall 30. Such sequential "click-locking" may occur until the front portion 62 abuts and stops against the outer face 36 of the wall 30 of the main housing 32. As mentioned, the power outlet 10 is accordingly retained in place relative to the wall 30 of the main housing 32 of the electrical power supply strip 12. As such, the stair-step segment 86 provides a sequential click-lock for the power outlet 10 to secure to the main housing 32. The wall 30 of the main housing 32 is entrapped between the front portion 62 of the power outlet housing 20 and the stair-step segment 86.

It is to be appreciated that the modular attribute of the power outlet 10 allows the overall power supply strip 12 to configured with various/varied power outlets 10 at various/varied locations on/along the power supply strip 12. As such, various power supply strips 12 may have various configurations. As such, various power supply strips 12 may be individualized, customized, or the like.

FIGS. 16 and 17 show an example the power supply strip 12 in which at least two types of power outlets are provided. Within the example, a first type of power outlet 90 (e.g., a first power outlet), which provides a first electrical power type (e.g., approximately 110 volts AC at 60 Hz, with understanding that variations are contemplated) is shown as already located within the main housing 32. With the above-described power outlet 10 installed (i.e., via the motion direction D as described above) in the main housing 32, as described above, the power outlet 10 is thus a second type of power outlet. As mentioned above, the power outlet 10 (e.g., the second type of power outlet) may provide the power format (e.g., 3 to 20 volts DC).

Of course, the power supply strip 12 includes multiple locations, with each location being able to receive power outlet (e.g., either power outlet 10 or power outlet 90). Either power outlet 10 or power outlet 90 may be place at any location on the power supply strip 12. Moreover, any number of power outlet(s) 10 and any complement number of power outlet(s) 90 may be placed into the power supply strip 12. Of course, the numbers of each of power outlet(s) 10 and power outlet(s) 90 simply are limited by the total available spaces (e.g., apertures 42).

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or." In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes," "having," "has," "with," and/or variants thereof are used in either the detailed description or the claims, such terms are intended to be inclusive in a manner similar to the term "comprising."

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed:

1. A power outlet for an electrical power supply strip, the strip being configured to receive a first electrical power type, which is an alternating current (AC), and having a main housing, the main housing having a wall, the wall having an outer face and an inner face, the wall having a thickness between the outer face and the inner face, the wall having a shaped aperture therethrough, the power outlet comprising:

a power outlet housing;

an electrical connection to connect within the electrical power supply strip to receive the first electrical power type;

electrical components located within the power outlet housing to change the first electrical power type to a second electrical power type, which is a direct current (DC); and a connection interface located at a front of the power outlet housing and supplying the second electrical power type;

the power outlet housing having:

a body with a shape that corresponds to the shape of the shaped aperture of the main housing;

a front portion at the front of the power outlet housing that is larger than the shaped aperture of the main housing to engage the outer face of the wall of the main housing and prevent the front portion from passing through the shaped aperture of the main housing; and an elastically deformable arm extending from the body, the deformable arm deforms as the arm passes through the shaped aperture of the main housing, the deformable arm has an engagement portion that engages the inner face of the wall of the main housing after the arm passes through the shaped aperture of the main housing to entrap the wall of the main housing between the arm and the front portion and retain the power outlet housing relative to the wall of the main housing, and the deformable arm being configured to accommodate a variation of the thickness of the wall of the main housing.

2. A power outlet as claimed in claim 1, wherein the electrical components are configured to convert approximately 100 to 240 volts AC at approximately 50 to 60 Hz as the first electrical power type to approximately 3 to 40 volts DC as the second electrical power type.

3. A power outlet as claimed in claim 1, wherein the connection interface includes a USB type outlet.

4. A power outlet as claimed in claim 1, wherein the deformable arm includes a head portion.

5. A power outlet as claimed in claim 4, wherein the head portion includes a tapered surface.

6. A power outlet as claimed in claim 5, wherein the tapered surface cams against the wall of the main housing to cause the deformable arm to deform as the arm passes through the shaped aperture of the main housing.

7. A power outlet as claimed in claim 4, wherein the head portion includes a stair-step segment.

8. A power outlet as claimed in claim 7, wherein the stair-step segment provides a sequential click-lock for the power outlet to secure to the main housing.

9. A power outlet as claimed in claim 8, wherein the front portion of the power outlet housing and the stair-step segment entrap the wall of the main housing therebetween.

10. An electrical power supply strip configured to receive a first electrical power type, which is an alternating current (AC), the power supply strip comprising:

a main housing, the main housing having a wall, the wall having an outer face and an inner face, the wall having a thickness between the outer face and the inner face, the wall having a plurality of shaped apertures therethrough;

a first power outlet providing a supply of the first electrical power type, the first power outlet being located within one of the shaped apertures; and a second power outlet comprising:

a power outlet housing;

an electrical connection to connect within the electrical power supply strip to receive the first electrical power type;

electrical components located within the power outlet housing to change the first electrical power type to a second electrical power type, which is a direct current (DC); and a connection interface located at a front of the power outlet housing and supplying the second electrical power type;

the power outlet housing having:

a body with a shape that corresponds to the shape of the shaped aperture of the main housing;

a front portion at the front of the power outlet housing that is larger than the shaped aperture of the main housing to engage the outer face of the wall of the main housing and prevent the front portion from passing through the shaped aperture of the main housing; and an elastically deformable arm extending from the body, the deformable arm deforms as the arm passes through the shaped aperture of the main housing, the deformable arm has an engagement portion that engages the inner face of the wall of the main housing after the arm passes through the shaped aperture of the main housing to entrap the wall of the main housing between the arm and the front portion and retain the power outlet housing relative to the wall of the main housing, and the deformable arm being configured to accommodate a variation of the thickness of the wall of the main housing.

11. A power supply strip as claimed in claim 10, wherein the electrical components are configured to convert approximately 100 to 240 volts AC at approximately 50 to 60 Hz as the first electrical power type to approximately 3 to 40 volts DC as the second electrical power type.

12. A power supply strip as claimed in claim 10, wherein the deformable arm includes a head portion.

13. A power supply strip as claimed in claim 12, wherein the head portion includes a tapered surface.

14. A power supply strip as claimed in claim 12, wherein the head portion includes a stair-step segment.

15. A power supply strip as claimed in claim 14, wherein the stair-step segment provides a sequential click-lock for the power outlet to secure to the main housing.

16. A power supply strip as claimed in claim 15, wherein the front portion of the power outlet housing and the stair-step segment entrap the wall of the main housing therebetween.

17. A method of providing an electrical power supply strip configured to receive a first electrical power type, which is an alternating current (AC), the method comprising:

providing a main housing, the main housing having a wall, the wall having an outer face and an inner face, the wall having a thickness between the outer face and the inner face, the wall having a plurality of shaped apertures therethrough;

providing a first power outlet that provides a supply of the first electrical power type, the first power outlet being located within one of the shaped apertures; and providing a second power outlet that comprises:

a power outlet housing;

an electrical connection to connect within the electrical power supply strip to receive the first electrical power type;

electrical components located within the power outlet housing to change the first electrical power type to a second electrical power type, which is a direct current (DC); and a connection interface located at a front of the power outlet housing and supplying the second electrical power type;

the power outlet housing having:

a body with a shape that corresponds to the shape of the shaped aperture of the main housing;

a front portion at the front of the power outlet housing that is larger than the shaped aperture of the main housing to engage the outer face of the wall of the main housing and prevent the front portion from passing through the shaped aperture of the main housing; and an elastically deformable arm extending from the body, the deformable arm deforms as the arm passes through the shaped aperture of the main housing, the deformable arm has an engagement portion that engages the inner face of the wall of the main housing after the arm passes through the shaped aperture of the main housing to entrap the wall of the main housing between the arm and the front portion and retain the power outlet housing relative to the wall of the main housing, and the deformable arm being configured to accommodate a variation of the thickness of the wall of the main housing.

18. A method as claimed in claim 17, wherein the electrical components are configured to convert approximately 100 to 240 volts AC at approximately 50 to 60 Hz as the first electrical power type to approximately 3 to 40 volts DC as the second electrical power type.

19. A method as claimed in claim 17, wherein the power supply strip includes multiple locations for receiving power outlets, the step of providing a first power outlet includes placing the first power outlet at any of the multiple locations, and the step of providing a second power outlet includes placing the second power outlet at any other of the multiple locations.

20. A method as claimed in claim 17, wherein the method includes multiple steps of at least one of providing a first power outlet and providing a second power outlet.

* * * * *